United States Patent [19]

Shimura et al.

[11] Patent Number: 4,750,209
[45] Date of Patent: Jun. 7, 1988

[54] SYSTEM FOR PROCESSING AN IMAGE HAVING BOTH LETTER AND PHOTOGRAPHIC INFORMATION

[75] Inventors: Hiroshi Shimura, Kawasaki; Koichi Suzuki, Yokohama; Noboru Murayama, Machida, all of Japan

[73] Assignee: Ricoh Company, Ltd., Tokyo, Japan

[21] Appl. No.: 940,920

[22] Filed: Dec. 12, 1986

[30] Foreign Application Priority Data

Dec. 12, 1985 [JP] Japan .................. 60-279790

[51] Int. Cl.[4] .............................. G06K 9/34
[52] U.S. Cl. ........................ 382/9; 382/48; 358/280
[58] Field of Search .......... 382/9, 48; 358/256, 358/280

[56] References Cited

U.S. PATENT DOCUMENTS

| | | | |
|---|---|---|---|
| 4,503,556 | 3/1985 | Scherl et al. | 382/9 |
| 4,504,972 | 3/1985 | Scherl et al. | 382/9 |
| 4,513,442 | 4/1985 | Scherl | 382/9 |
| 4,547,811 | 10/1985 | Ochi et al. | 382/9 |
| 4,553,172 | 11/1985 | Yamada et al. | 358/280 |

Primary Examiner—James J. Groody
Assistant Examiner—Michael D. Parker
Attorney, Agent, or Firm—Oblon, Fisher, Spivak, McClelland & Maier

[57] ABSTRACT

An image processing system processes a composite original image having both of letter and picture information to have the letter information extracted. An image signal in the form of pixel is checked to see if it is a letter pixel, in which case "1" is assigned, or a picture pixel, in which case "0" is assigned, so that a plane data of "1s" and "0s" is obtained and stored in a plane memory. At the same time, the image signal is converted into a binary image data which is stored into an image memory. The data stored in the plane memory is subjected to two-step digital filtering processing, first step to eliminate isolated black and white dots and second step to smooth the data, thereby obtaining filtered data which define one or more letter regions in an original document. Using the thus defined letter region data, the binary image data stored in the image memory is processed, thereby extracting only the letter image data.

5 Claims, 4 Drawing Sheets

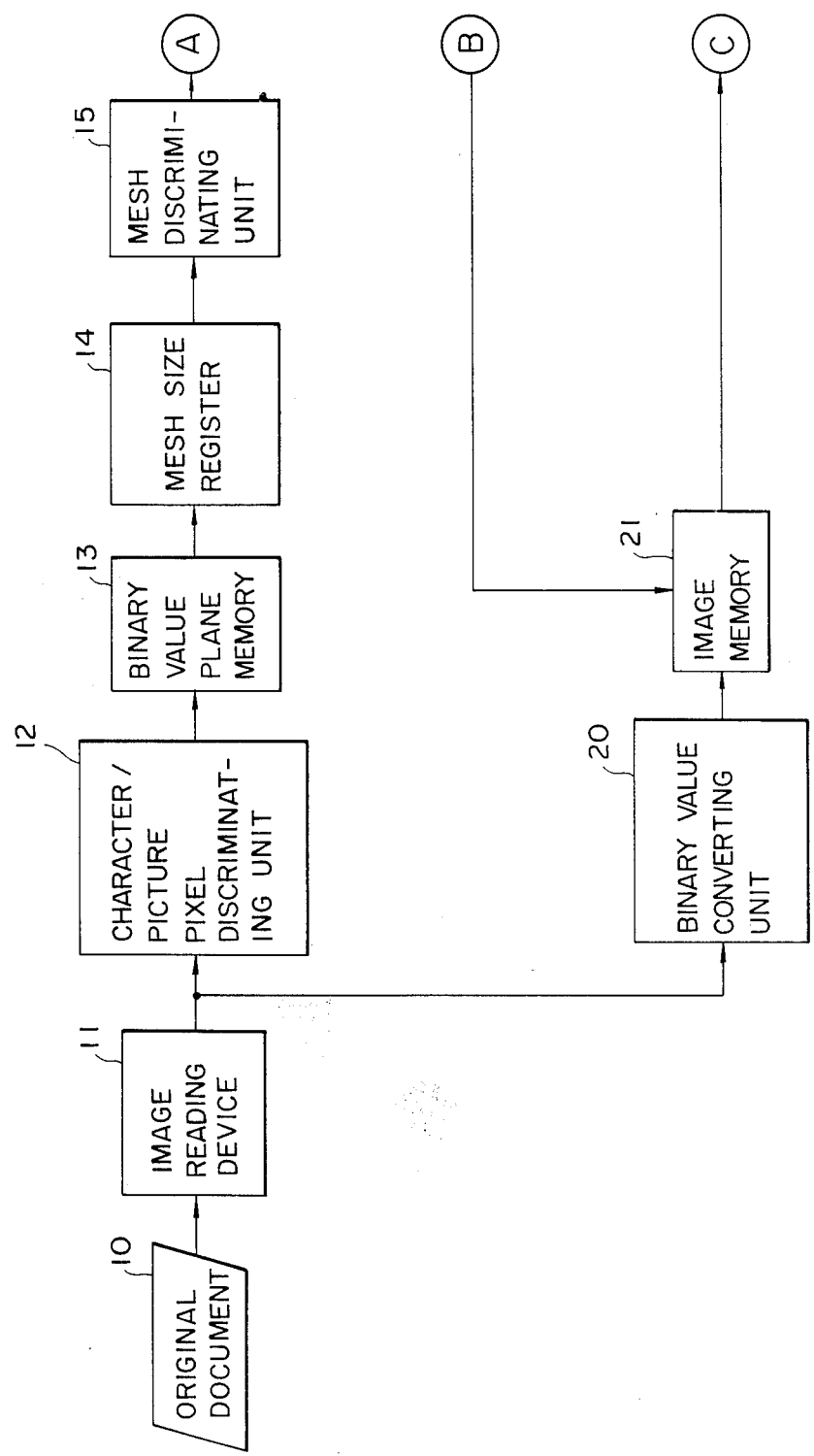

Fig.2a

| -1 | -1 | -1 |
|---|---|---|
| 0 | +3 | 0 |
| 0 | 0 | 0 |

Fig.2b

| 0 | 0 | 0 |
|---|---|---|
| 0 | +3 | 0 |
| -1 | -1 | -1 |

Fig.2c

| 0 | -1 | 0 |
|---|---|---|
| -1 | +4 | -1 |
| 0 | -1 | 0 |

SYSTEM FOR PROCESSING AN IMAGE HAVING BOTH LETTER AND PHOTOGRAPHIC INFORMATION

BACKGROUND OF THE INVENTION

1. Field of the Invention

This invention generally relates to an image processing system and method, and, in particular, to an image processing system for processing an image having both letter and photographic information to extract the letter information therefrom.

2. Description of the Prior Art

In an image processing system, such as a facsimile machine or image processor, it is often the case to require to handle an original document having both of a binary-valued image, such as characters and symbols and generically referred to as letter information hereinafter, and a continuously varying tone image, such as photographic or graphic information. In such a case, if only the letter information can be extracted from the image signal obtained by optically reading a composite original having both of letter and photographic information, an optimal image processing technique, such as data compression, can be applied to the letter information, thereby allowing to enhance the performance of an image processing system. There has been proposed to discriminate the letter region from the photographic region based on the distribution of run-lengths which are obtained by thresholding an optically read image signal with a predetermined threshold level; however, this technique is not reliable and an accurate discrimination cannot be expected at all times.

SUMMARY OF THE INVENTION

In accordance with the principle of the present invention, there is provided an image processing system in which each pixel is determined whether it is a letter pixel, in which case one of the binary data, "0" or "1", is assigned to that pixel, or a photographic pixel, in which case the other of the binary data, "1" or "0", is assigned to that pixel. The result of this determination is stored in a binary value plane memory; on the other hand, the pixel is subjected to a thresholding operation, thereby being converted into one of the binary data, which is then stored into an image memory. Each of the data stored in the binary value plane memory and the corresponding one of the data stored in the image memory originate from the same pixel. Then, the data stored in the binary value plane is subjected to digital filtering process in a predetermined fashion, thereby creating data determining one or more areas or regions of an original document, in which the letter pixels have been obtained. Based on this letter image area information, the letter pixels are extracted from the data stored in the image memory.

It is therefore a primary object of the present invention to obviate the disadvantages of the prior art as described above and to provide an improved image processing system.

Another object of the present invention is to provide an improved image processing system for processing a composite original image having both letter and photographic information to extract the letter information therefrom.

A further object of the present invention is to provide an improved image processing system capable of discriminating letter pixels from photographic or multitone level pixels.

A still further object of the present invention is to provide an improved image processing system having an enhanced performance.

Other objects, advantages and novel features of the present invention will become apparent from the following detailed description of the invention when considered in conjunction with the accompanying drawings.

BRIEF DESCRIPTION OF THE DRAWINGS

FIGS. 1a and 1b are to be combined;

FIGS. 1a and 1b, when combined as illustrated in FIG. 1, define a block diagram showing the overall structure of an image processing system constructed in accordance with one embodiment of the present invention;

FIGS. 2a through 2c are illustrations showing masks having weighting factors to be used for carrying out the digital filtering function in the structure shown in FIGS. 1a and 1b.

DESCRIPTION OF THE PREFERRED EMBODIMENTS

Figure 1B:
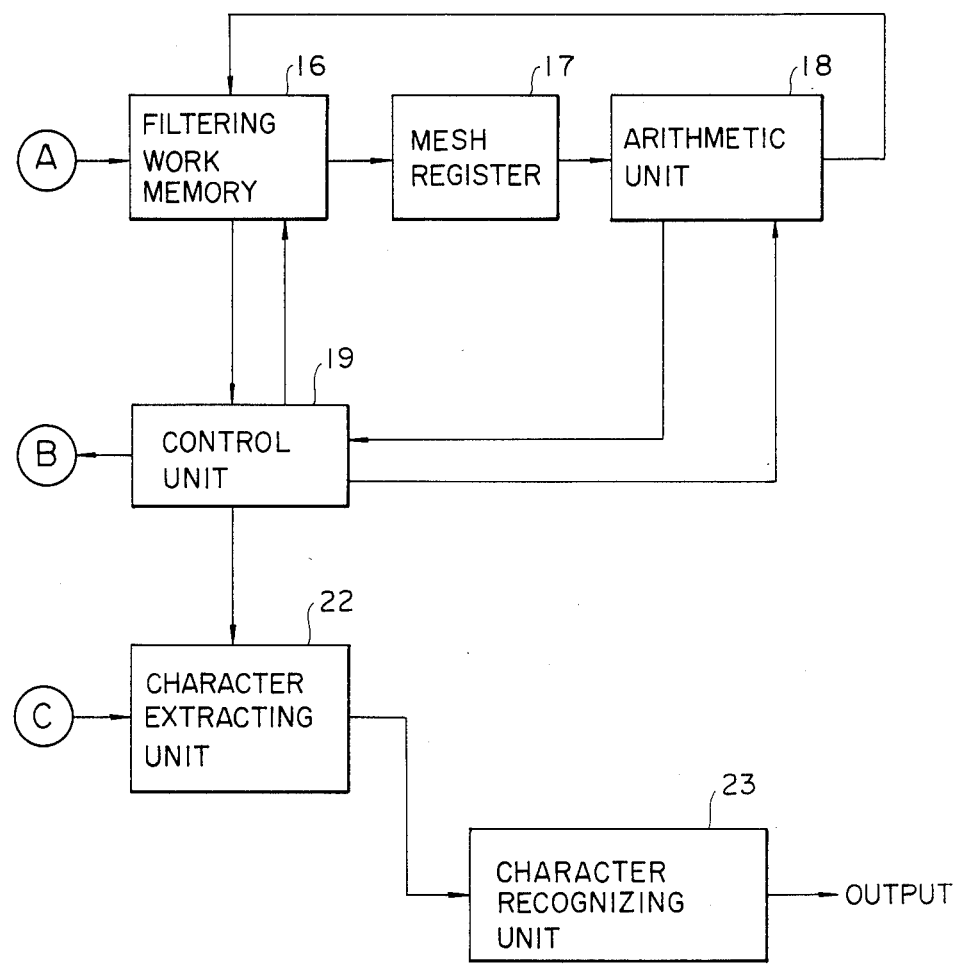
Figure 1:
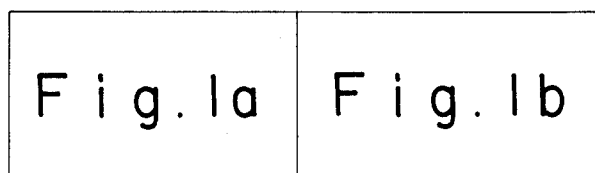
FIG. 1 is an illustration showing how
Figure 3:
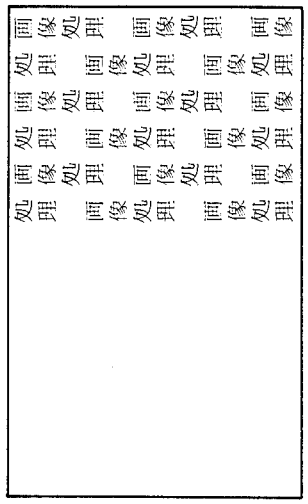
FIGS. 3 through 6 are schematic illustrations which are useful for understanding the operation of the structure shown in FIGS. 1a and 1b.

Referring now to FIGS. 1a and 1b combined as illustrated in FIG. 1, there is schematically shown an image processing system for extracting only letter information from a composite original document having both letter and photographic information. As shown, an original document 10 to be processed is a composite original document having both letter and photographic information, as shown in FIG. 3. It is to be noted that in FIG. 3, the left half contains graphic or photographic information, such as a picture having a continuously varying tone, and the right half contains letter information (in the illustrated case, the term of "image processing" is written repeatedly from top to bottom and from right to left in Kanji or Chinese character). The original document 10 is optically read by an image reading device 11 of the raster scanning type, which includes a plurality of light-receiving elements arranged in the form of a single array as well known in the art, so that the original document 10 is optically read line by line at a predetermined pitch, whereby the image data in analog quantity is converted into a multi-level digital quantity, thereby outputting image information corresponding to the image density of each pixel. The image information per pixel thus output from the image reading device 11 is supplied to a binary value converting circuit 20 one after another, where the image information is converted into a corresponding binary value which is then stored in an image memory 21.

On the other hand, the image information output from the image reading device 11 is also supplied to a character/picture pixel discriminating unit 12. It is to be noted that the terms "character" and "letter" are used interchangeably in this specification, and both of the terms are used to include symbols because these terms are used to indicate a line image defined by one or more strokes; whereas, terms "graphic" and "photographic" are used interchangeably because these terms are used to indicate an image having a continuously varying tone, such as a photographic picture. At the character/- picture pixel discriminating unit 12, it is determined pixel by pixel whether it is a letter pixel or a picture pixel. And, if it has been determined as a letter pixel, then the unit 12 assigns the binary data "1"; on the other hand, if it has been determined as a picture pixel, then the unit 12 assigns the other binary data "0." The determination of a letter or picture pixel can be carried out many ways, but it is preferable to use the technique which relies on the image density difference between a pixel of interest and its surrounding pixels as disclosed in the Japanese Patent Application No. 60-67399, which is incorporated by reference.

The result of discrimination output from the character/picture pixel discriminating unit 12 is stored into a binary value plane memory 13. In the preferred embodiment, the address or location of storing the result of discrimination from the unit 12 in the binary value plane memory 13 corresponds to the address or location of storing the binary value image data in the image memory 21. In other words, if the image data to be stored in a particular address or location of the image memory 21 has been discriminated as a letter pixel, then the binary data "1" is stored in the corresponding address or location of the binary value plane memory 13; on the other hand, if the image data has been discriminated as a picture pixel, then the other binary data "0" is stored in the corresponding address of the binary value plane memory 13. As described above, in the structure shown in FIG. 1a, the output data from the image reading device 11 is directly determined whether it is a letter or picture pixel; however, alternatively, it may also be so structured that the output data from the image reading device 11 is once stored in a memory and then the data is subjected to a discrimination process.

Figure 4:
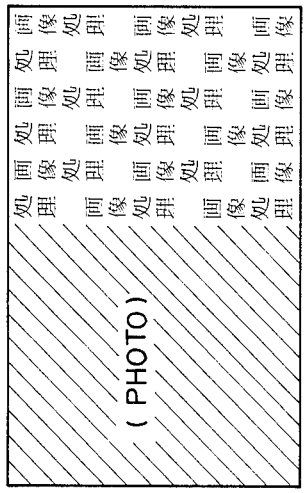

As a result of the above-described letter/picture discrimination processing to assign "1" to each of the letter pixels and "0" to each of the picture pixels, the composite original document shown in FIG. 3 is converted into a format shown in FIG. 4. That is, the picture portion of the original image has been eliminated and only the letter portion of the original image remains. In accordance with the present invention, a digital filtering processing is applied to the thus discriminated image data, or the data shown in FIG. 4, so as to determine one or more letter regions or areas in the original image. A particular embodiment of such a digital filtering will be described hereinbelow.

In the first place, the binary value plane memory 13 is divided into M X N meshes, each of which has m X n pixels, and the data in the binary value plane memory 13 are transferred to a mesh size register 14 mesh by mesh. The mesh size register 14 contains a predetermined number of bits corresponding to the number of data in one mesh. For example, in one embodiment, the mesh is square in shape and has a size of 4 pixels by 4 pixels, and, thus, in this example, the mesh has 16 pixels. The pixels of one mesh having the size of m X n in the memory 13 are transferred to the mesh size register 14, where the number of binary data "1" (black pixels) within the mesh is calculated and then the calculated number of "1s" is compared with a predetermined value (e.g., "2" in the case of 4×4 mesh). Then, if the calculated number of "1s" is larger than the predetermined value, then "1" is assigned to that mesh (m,n) and its assigned data is stored into a filtering work memory 16. On the other hand, if the calculated number of "1s" is not larger than the predetermined value, then "0" is assigned to that mesh (m,n) and its assigned data is stored into the filtering work memory 16. The above-described procedure is repeatedly carried out for each of the meshes (m,n) defined in the binary value plane memory 13. It is to be noted, however, that m is equal to or larger than unity but equal to or smaller than M and n is equal to or larger than unity but equal to or smaller than N.

With the above-described procedure, there is obtained binary value plane information with enhancement in letter portions in the filtering work memory 16 and this procedure also has an effect of eliminating any noise data. In the preferred embodiment, the filtering work memory 16 has the same bit structure as that of the binary value plane memory 13. In this case, it is not necessary to provide the binary value plane memory 13 and the filtering work memory 16 separately, though these elements are provided separately in the structure shown in FIGS. 1a and 1b.

Then, a mesh of interest and its surrounding meshes adjacent thereto are transferred to a mesh register 17 from the filtering work memory 16. In one example, the mesh register 17 has a size of 3×3 meshes. When the data have been transferred to the mesh register, an arithmetic unit 18 carries out either one of the following two processings A and B for the mesh of interest, i.e., mesh (m,n), using the surrounding meshes, and then have its result again stored in the filtering work memory 16. In this case, restoring is carried out superposingly so that the data is renewed by this processing.

Processing A:

$$D = 3 \times \text{mesh}(m,n) - \text{mesh}(m+1, n-1) - \text{mesh}(m+1, n) - \text{mesh}(m+1, n+1)$$

if D is equal to or larger than 3, then assign "0" to mesh(m,n);
if D is equal to or smaller than −2, then assign "1" to mesh(m,n); and
otherwise (D larger than −2 but smaller than 3), nothing changes.

Processing B:

$$D = 3 \times \text{mesh}(m,n) - \text{mesh}(m-1, n-1) - \text{mesh}(m-1, n)$$

if D is equal to or larger than 3, then assign "0" to mesh(m,n);
if D is equal to or smaller than −2, then assign "1" to mesh(m,n); and
otherwise (D larger than −2 but smaller than 3), nothing changes.

Figure 5:
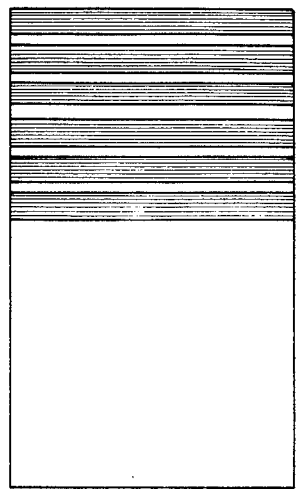

It is to be noted that the processing A is carried out for m from 1 to M and for n from 1 to N; whereas, the processing B is carried out for m from M to 1 and for n from N to 1. FIG. 2a shows a mask pattern for use in the processing A and FIG. 2b shows a mask pattern for use in the processing B. By carrying out the processing A and/or B over a predetermined number of times for each mesh, there is obtained data in the filtering work memory 16, which represent the binary plane information having further enhanced letter portions as shown in FIG. 5. As may have been already understood, these processings A and B have an effect of eliminating isolated black or white dots.

Subsequently, again using a loop including the filtering work memory 16, mesh register 17 and arithmetic unit 18, the data stored in the filtering work memory 16 is subjected to the following processing C.

Processing C:

$$D = 4 \times \text{mesh}(m,n) - \text{mesh}(m-1,n) - \text{mesh}(m,n-1) \\ - \text{mesh}(m,n+1) - \text{mesh}(m+1,n)$$

if D is equal to or larger than 4, then assign "0" to mesh(m,n);

if D is equal to or smaller than −2, then assign "1" to mesh(m,n); and otherwise (D larger than −2 but smaller than 4), nothing changes.

Figure 6:
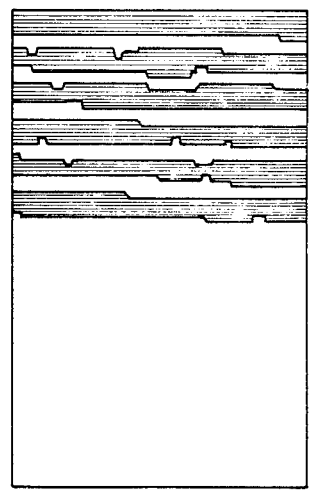

For example, the processing C is carried out first for m from 1 to M and for n from 1 to N and then for m from M to 1 and for n from N to 1. FIG. 2c shows a mask pattern suitable for use in the processing C. The processing C is repeatedly carried out until the values of each mesh do not change due to application of the processing C. As a result, there is obtained the binary value plane information shown in FIG. 6. As is obvious from the format of the mask pattern shown in FIG. 2c, the processing C has an effect of smoothing the letter regions so that the irregularities present in the data shown in FIG. 5 can be eliminated by the application of this processing C. The letter regions or areas are defined as vertical stripes each corresponding to each column of letters printed in the composite original document shown in FIG. 3.

It should be noted that a control unit 19 is provided as connected to the filtering work memory 16 and also to the arithmetic unit 18 so that the above-described various functions, such as transfer of data from the filtering work memory 16 to the mesh register 17, alteration of weighting factors in the calculations at the arithmetic unit 18, and process repetition control, are all controlled by the control unit 19, which may, for example, be comprised of a microprocessor.

When the application of the above-mentioned processing C to the data stored in the filtering work memory 16 does not change the status of the data stored in the memory 16, it indicates that the digital filtering has been completed, so that a signal to that effect is supplied from the arithmetic unit 18 to the control unit 19. If that happens, then the control unit 19 causes the data of binary value plane information currently stored in the filtering work memory 16 to be transferred to a character extracting unit 22 in sequence, and, at the same time and in synchronism therewith, the binary value image data is read out from the image memory 21 and supplied to the character extracting unit 22. The character extracting unit 22 allows the image data read from the image memory 21 to be passed to a character recognizing unit 23 only when the corresponding data supplied from the filtering work memory 16 through the control unit 19 is "1." Accordingly, only the letter data information in the composite original document shown in FIG. 3 is extracted and supplied to the character recognizing unit 23, where the character or letter data is recognized and its recognized information is supplied as its output.

It is to be noted that when the data stored in the plane memory 13 is processed by the first filtering step mesh by mesh, the number of output data stored in the filtering work memory 16 is reduced by the factor of the size of the mesh, or the total number of pixels in the mesh. Thus, when the extracting step is carried out using the character extracting unit 22, the control unit 19 controls such that each letter region defining data from the filtering work memory 16 is applied to each corresponding mesh of the data stored in the image memory 21.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. System for extracting letter information from a composite original image having both letter and picture information, comprising:

reading means for optically reading said composite original document to produce an image signal in the form of a pixel;

first determining means for determining said image signal to be either a letter pixel or a picture pixel, thereby assigning a first binary data to said image signal if said image signal has been determined to be a letter pixel and a second binary data, which is different from said first binary data, to said image signal if said image signal has been determined to be a picture pixel;

first storing means for storing said first and second binary data;

converting means for converting said image signal into a binary image data;

second storing means for storing said binary image data;

filtering means for subjecting said first and second binary data stored in said first storing means to a predetermined digital filtering processing, thereby producing letter region data; and extracting means for extracting said letter information from said binary image data stored in said second storing means in accordance with said letter region data.

2. The system of claim 1 wherein said first storing means includes a plane memory for storing said first and second binary data in a plane having a predetermined size.

3. The system of claim 2 wherein said filtering means includes first filtering means for filtering said data stored in said first storing means to remove any isolated black or white dots and second filtering means for filtering said data filtered by said first filtering means to smooth said filtered data which define said letter region data.

4. The system of claim 3 wherein said first filtering means includes dividing means for dividing said data stored in said plane memory into a predetermined number of meshes and second determining means for determining whether or not a number of predetermined ones of said first and second binary data of each of said meshes is equal to or larger than a predetermined value and then assigning one of the binary data to each mesh if said number is equal to or larger than said predetermined value, otherwise assigning the other of the binary data to each mesh and third storing means for storing said one and the other of the binary data.

5. The system of claim 4 wherein said second filtering means includes arithmetic means for carrying out a calculation according to a predetermined formula to each of the data stored in said third storing means, whereby said arithmetic means repeatedly carries out the calculation until no change occurs as a result of the calculation.

* * * * *